United States Patent
Sueno

(10) Patent No.: US 10,173,474 B2
(45) Date of Patent: Jan. 8, 2019

(54) PNEUMATIC TIRE

(71) Applicant: Sumitomo Rubber Industries, Ltd., Kobe-shi, Hyogo (JP)

(72) Inventor: Junya Sueno, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 587 days.

(21) Appl. No.: 14/801,520

(22) Filed: Jul. 16, 2015

(65) Prior Publication Data

US 2016/0039248 A1 Feb. 11, 2016

(30) Foreign Application Priority Data

Aug. 7, 2014 (JP) .................................. 2014-161684

(51) Int. Cl.
- B60C 11/12 (2006.01)
- B60C 11/03 (2006.01)
- B60C 11/04 (2006.01)

(52) U.S. Cl.
CPC ...... B60C 11/0304 (2013.01); B60C 11/0306 (2013.01); B60C 11/0311 (2013.01);
(Continued)

(58) Field of Classification Search
CPC ......... B60C 11/0304; B60C 2011/0383; B60C 2011/0372; B60C 2011/0381; B60C 11/12
See application file for complete search history.

(56) References Cited

U.S. PATENT DOCUMENTS

| | | | | |
|---|---|---|---|---|
| 2009/0255614 A1* | 10/2009 | Ebiko | .................. | B60C 11/0302 152/209.8 |
| 2012/0118455 A1* | 5/2012 | Hada | ................... | B60C 11/0304 152/209.8 |

(Continued)

FOREIGN PATENT DOCUMENTS

| EP | 114594 A2 * | 8/1984 |
|---|---|---|
| EP | 2 108 531 A2 | 10/2009 |

(Continued)

OTHER PUBLICATIONS

Translation for Europe 114594 (no date).*

(Continued)

*Primary Examiner* — Steven D Maki
(74) *Attorney, Agent, or Firm* — Birch, Stewart, Kolasch & Birch LLP

(57) ABSTRACT

A pneumatic tire has a tread pattern capable of improving wet performance and steering stability in a well balanced manner. An inboard middle land portion is provided with inboard middle axial grooves connecting between an inboard shoulder main groove and an inboard crown main groove and inclined at 20 to 30 degrees. An outboard middle land portion is provided with outboard middle semi-blind grooves extending axially inwardly from a outboard shoulder main groove, and outboard middle sipes extending from the axially inner ends of the outboard middle semi-blind grooves to the outboard crown main groove. The outboard middle semi-blind grooves and the outboard middle sipes are inclined at 20 to 30 degrees. A center land portion is provided with inboard crown semi-blind grooves extending from the inboard crown main groove, and outboard crown semi-blind grooves extending from the outboard crown main groove.

10 Claims, 6 Drawing Sheets

(52) U.S. Cl.
CPC .............. *B60C 11/04* (2013.01); *B60C 11/12* (2013.01); *B60C 2011/0353* (2013.01); *B60C 2011/0372* (2013.01); *B60C 2011/0381* (2013.01); *B60C 2011/0383* (2013.01)

(56) References Cited

U.S. PATENT DOCUMENTS

| | | |
|---|---|---|
| 2013/0112325 A1 | 5/2013 | Mukai |
| 2013/0133797 A1* | 5/2013 | Takagi .................... B60C 11/03 152/209.8 |
| 2016/0257172 A1* | 9/2016 | Mukai ................ B60C 11/1315 |

FOREIGN PATENT DOCUMENTS

| | | | |
|---|---|---|---|
| JP | 07-186626 A | * | 7/1995 |
| JP | 2012-188080 A | * | 10/2012 |

OTHER PUBLICATIONS

Machine transalation for Japan 2012-188080 (no date).*
Machine translation for Japan 07-186626 (no date).*
Extended European Search Report dated Jan. 5, 2016 for Application No. 15177042.7.

* cited by examiner

PNEUMATIC TIRE

BACKGROUND OF THE INVENTION

The present invention relates to a pneumatic tire, more particularly to a tread pattern capable of improving wet performance and steering stability in a well balanced manner.

Pneumatic tires are required to exert excellent wet performance and steering stability. In order to improve wet performance, the tread portion of a pneumatic tire is usually provided with circumferential grooves and/or axial grooves having a large groove volume.

In such pneumatic tire, however, due to the grooves having a large groove volume, the rigidity of the tread portion is decreased, and the steering stability tends to deteriorate.

SUMMARY OF THE INVENTION

It is therefore, an object of the present invention to provide a pneumatic tire, in which wet performance and steering stability are improved in a well balanced manner.

The pneumatic tire according to the present invention is an asymmetrical tire whose tread pattern is asymmetric about the tire equator. Thus, the tread portion has an outboard tread edge to be positioned away from the center of the vehicle body and an inboard tread edge to be positioned close to the center of the vehicle body.

According thereto, in this application, the terms "outboard" and "inboard" are used toward the outboard tread edge and inboard tread edge, respectively, to refer relative positions in the tire axial direction.

The terms "axially inner", "axially inward" and the like are used toward the tire equator, and the terms "axially outer", "axially outward" and the like are used toward the adjacent tread edge in order to refer relative positions in the tire axial direction.

The pneumatic tire according to the present invention comprises a tread portion having an outboard tread edge and inboard tread edge, and the tread portion from the outboard tread edge to the inboard tread edge is divided into five land portions, which are an outboard shoulder land portion, an outboard middle land portion, a center land portion, an inboard middle land portion, and an inboard shoulder land portion, by four circumferentially continuously extending main grooves, which are an outboard shoulder main groove, an outboard crown main groove, an inboard crown main groove, and an inboard shoulder main groove, the inboard middle land portion is provided with inboard middle axial grooves extending from the inboard shoulder main groove to the inboard crown main groove at an angle of from 20 to 30 degrees with respect to the tire axial direction, the outboard middle land portion is provided with outboard middle semi-blind grooves extending axially inwardly from the outboard shoulder main groove and terminating within the outboard middle land portion, and outboard middle sipes respectively extending from the axially inner ends of the outboard middle semi-blind grooves to the outboard crown main groove, the outboard middle semi-blind grooves and the outboard middle sipes are inclined at an angle of 20 to 30 degrees with respect to the tire axial direction, the center land portion is provided with inboard crown semi-blind grooves extending from the inboard crown main groove toward the outboard crown main groove and terminating within the center land portion, and outboard crown semi-blind grooves extending from the outboard crown main groove toward the inboard crown main groove and terminating within the center land portion.

The pneumatic tire according to the present invention may have the following features:

(1) the inboard middle axial grooves and the outboard middle sipes are inclined in the same direction;

(2) the number of the inboard middle axial grooves is less than the number of the outboard middle sipes;

(3) the depths of the inboard crown semi-blind grooves and the outboard crown semi-blind grooves are not more than 5 mm;

(4) the inboard crown semi-blind grooves and the outboard crown semi-blind grooves are inclined in the same direction;

(5) the inboard middle land portion is circumferentially divided by the inboard middle axial grooves into a row of inboard middle blocks each provided with an inboard middle sipe extending from the inboard crown main groove toward the inboard shoulder main groove and terminating within the inboard middle block.

ADVANTAGEOUS EFFECTS OF THE INVENTION

The inboard middle axial grooves ensure axial rigidity of the inboard middle land portion, and can lead the water therein toward the main grooves by utilizing tire rotations. Accordingly, the wet performance and the steering stability are improved in a well balanced manner.

The outboard middle semi-blind grooves and the outboard middle sipes prevent the rigidity of the outboard middle land portion from decreasing. Therefore, the difference in rigidity is decreased between the outboard middle land portion subjected to a large lateral force during cornering and the inboard middle land portion provided with the inboard middle axial grooves, and both clockwise vehicle turning and counter-clockwise vehicle turning can be made smoothly to further improve the steering stability. The outboard middle sipes improve the wet performance by their water-absorbing property and edge effect.

The center land portion is provided with the inboard crown semi-blind grooves and the outboard crown semi-blind grooves. Thereby, water existing between the center land portion and the road surface can be effectively drained. Further, the inboard crown semi-blind grooves and the outboard crown semi-blind grooves make it possible to even the rigidity of the center land portion between both side edge portions. Therefore, the clockwise vehicle turning and counter-clockwise vehicle turning can be made more smoothly.

Accordingly, the pneumatic tire according to the present invention is improved in the wet performance and the steering stability in a well balanced manner.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e.

JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges Ti and To are the axial outermost edges of the ground contacting patch which occurs under the normally inflated loaded condition when the camber angle of the tire is zero.

The tread width TW is the width measured under the normally inflated unloaded condition, as the axial distance between the tread edges Ti and To determined as above.

The term "groove width" means a width measured perpendicularly to the widthwise center line of the groove at the groove top.

DESCRIPTION OF THE PREFERRED EMBODIMENTS

Figure 1:
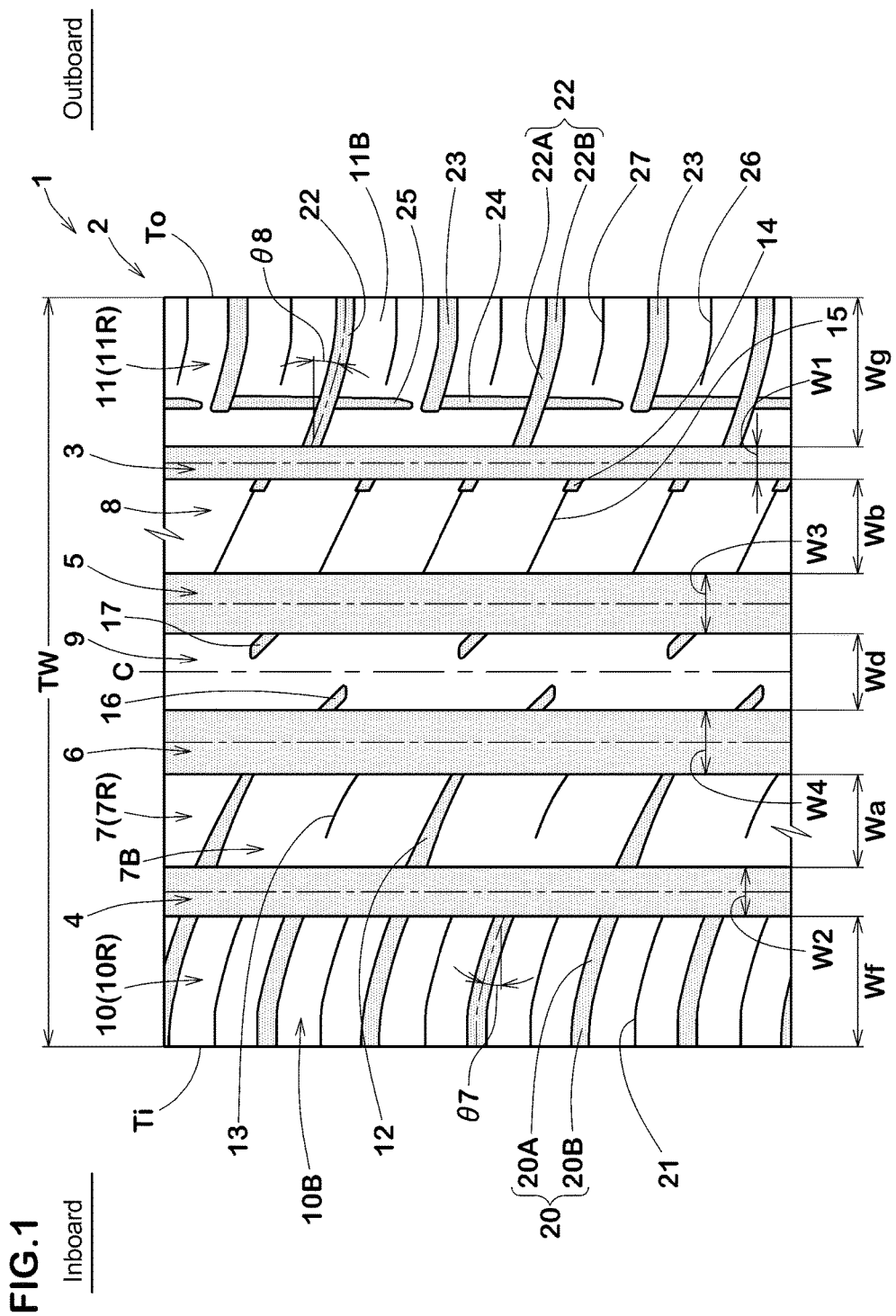
FIG. 1 is a developed view of the tread portion of a pneumatic tire as an embodiment of the present invention.
Figure 2:
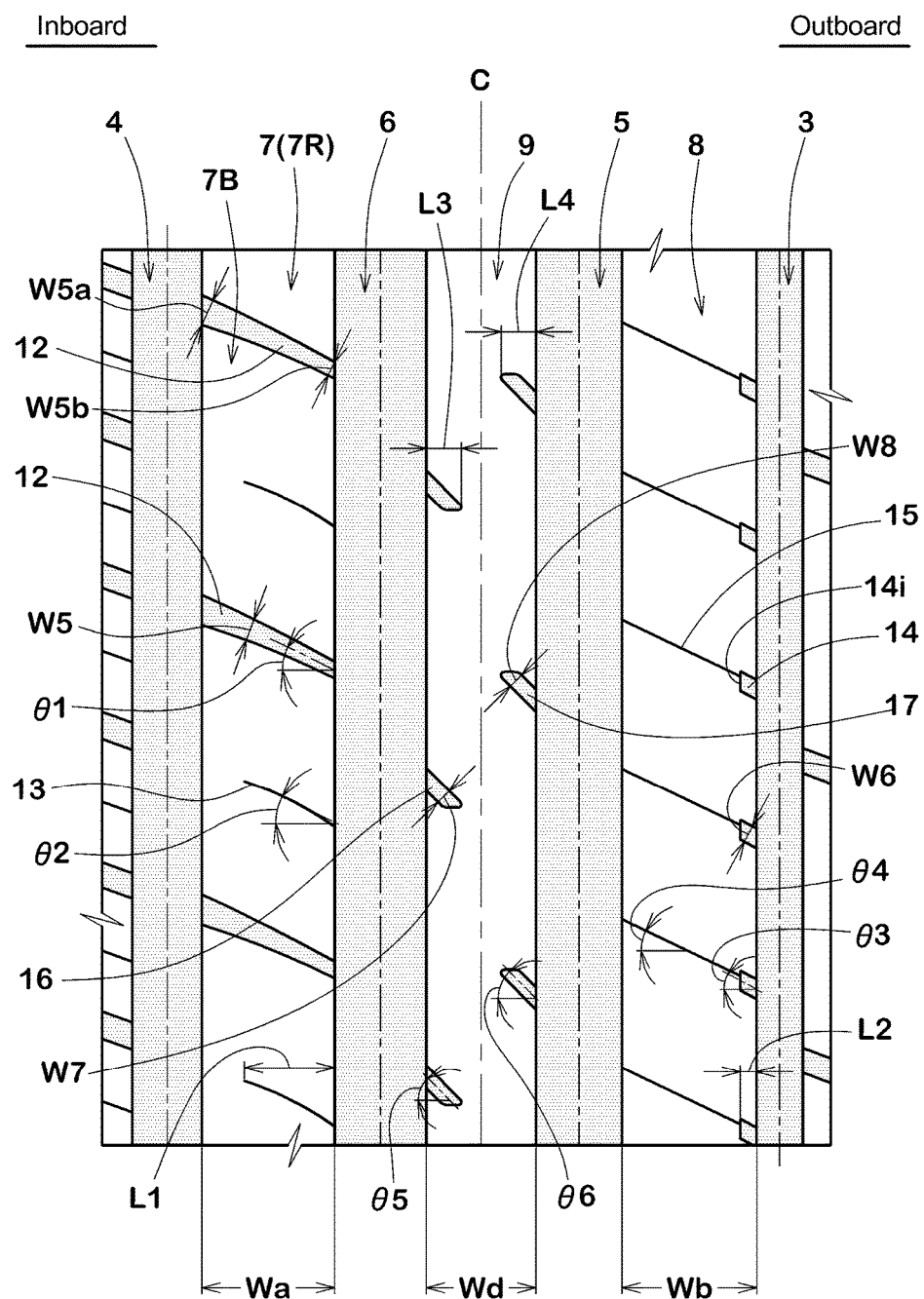
FIG. 2 is an enlarged view of the center land portion and the middle land portions shown in FIG. 1.

Embodiments of the present invention will now be described in detail in conjunction with the accompanying drawings, taking passenger car pneumatic tires as an example, As well known in the art, a pneumatic tire 1 comprises a tread portion 2 whose outer surface defines the tread, a pair of axially spaced bead portions each with a bead core therein, a pair of sidewall portions extending between the tread edges and the bead portions, a carcass extending between the bead portions, and a tread reinforcing belt disposed radially outside the carcass in the tread portion.

According to the present invention, the tread portion 2 is provided with a tread pattern asymmetric about the tire equator, and the tread portion 2 has an outboard tread edge Ti and an inboard tread edge To to be positioned toward the outside and inside of a vehicle, respectively, when the tire is installed on the vehicle. For example, the sidewall portion to be positioned toward the outside is provided with an indication such as "outside", and the sidewall portion to be positioned toward the inside is provided with an indication such as "inside".

The tread portion 2 is provided with four circumferentially continuously extending main grooves 3-6 which are: an outboard crown main groove 5 on the outboard tread edge To side of the tire equator C, an outboard shoulder main groove 3 on the outboard tread edge To side of the main groove 5, an inboard crown main groove 6 on the inboard tread edge Ti side of the tire equator c, and an inboard shoulder main groove 4 on the inboard tread edge Ti side of the main groove 6.

The tread portion 2 is therefore, axially divided into an inboard middle land portion 7 between the main grooves 4 and 6, an outboard middle land portion 8 between the main grooves 3 and 5, a center land portion 9 between the main grooves 5 and 6, an inboard shoulder land portion 10 between the inboard tread edge Ti and the inboard shoulder main groove 4, and an outboard shoulder land portion 11 between the outboard tread edge To and the outboard shoulder main groove 3.

Figure 3:
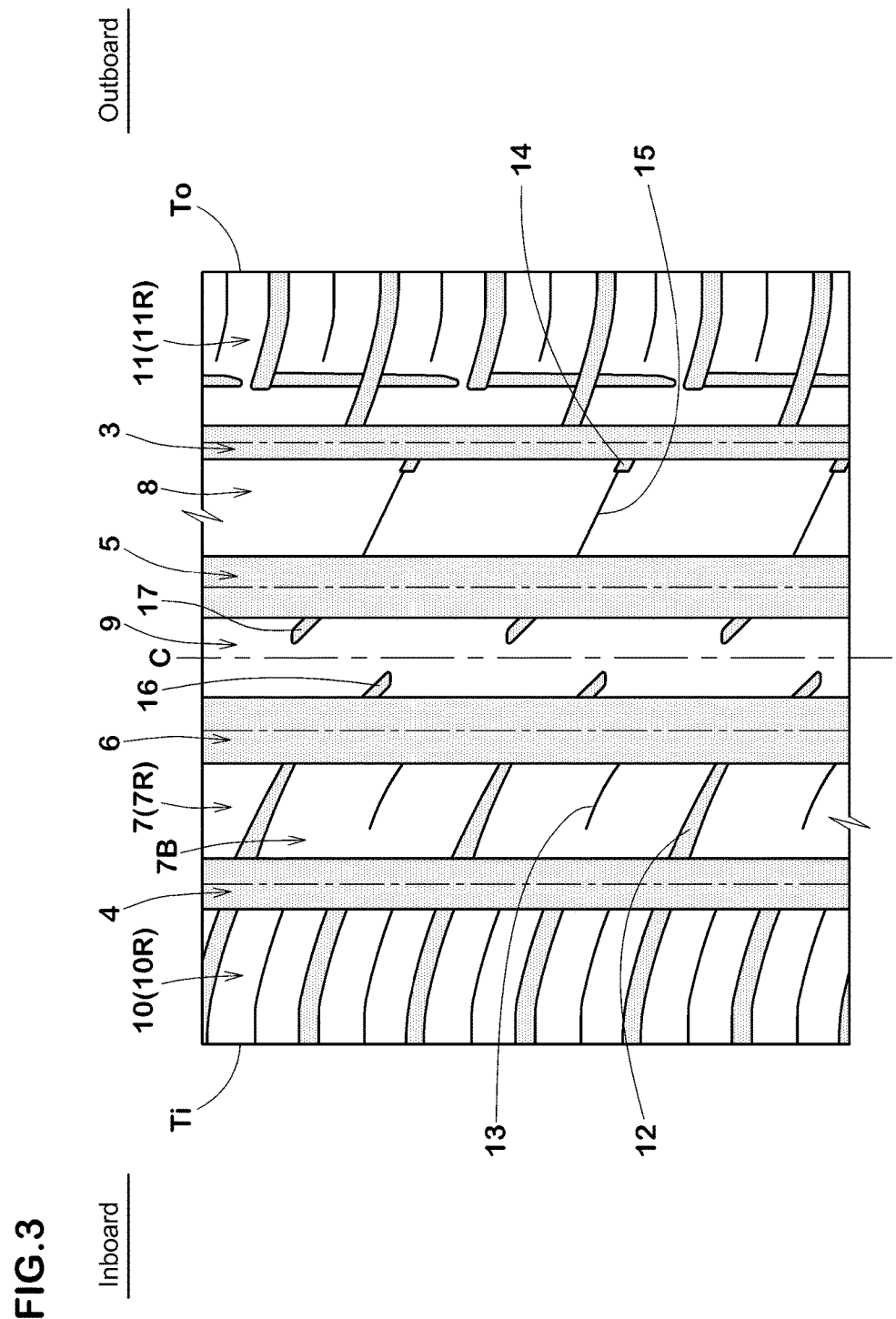
FIG. 3 and FIG. 4 are developed views each showing the tread portion of a pneumatic tire as another embodiment of the present invention.
Figure 4:
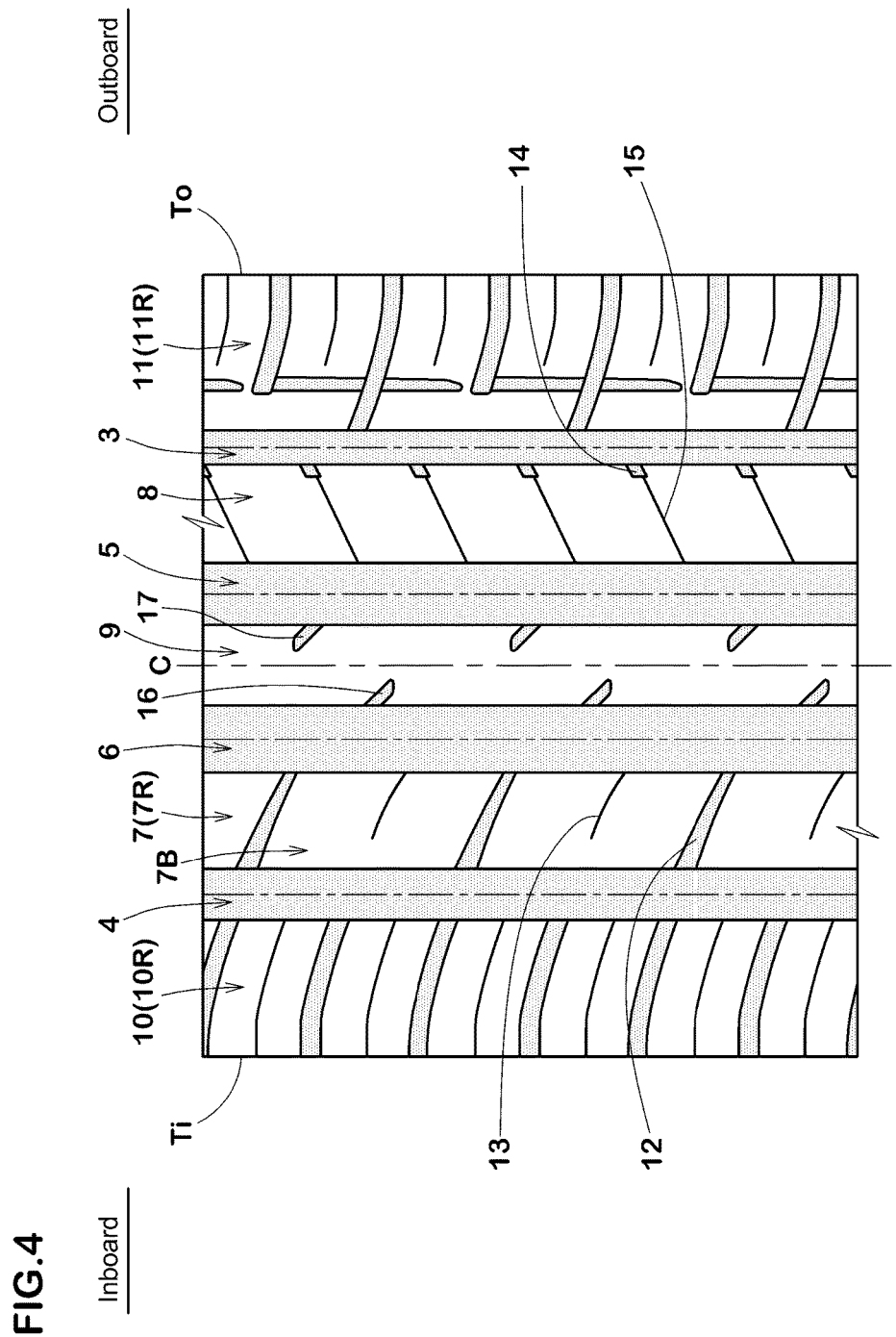
Figure 5:
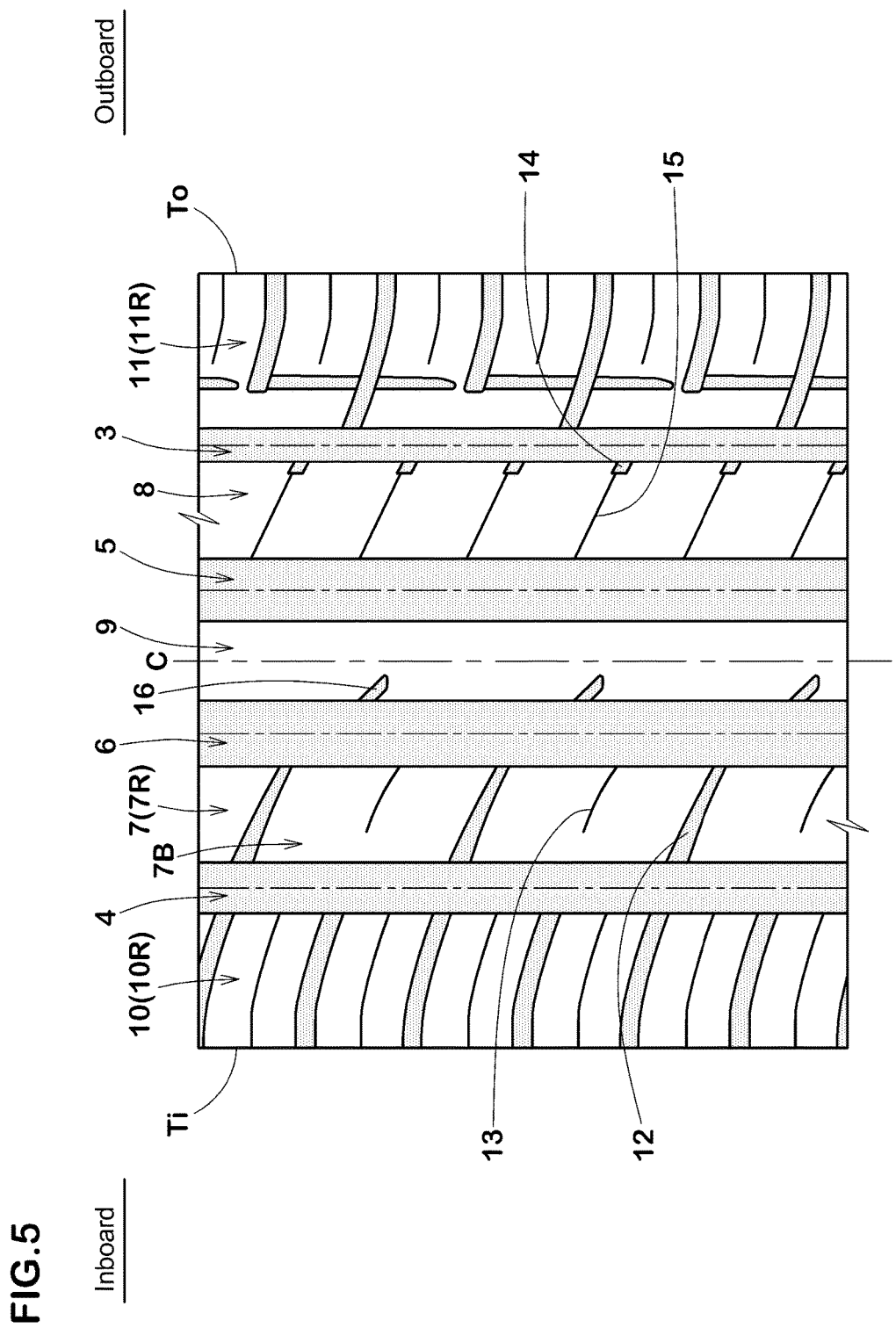
FIG. 5 and FIG. 6 are developed views each showing the tread portion of a comparative example.
Figure 6:
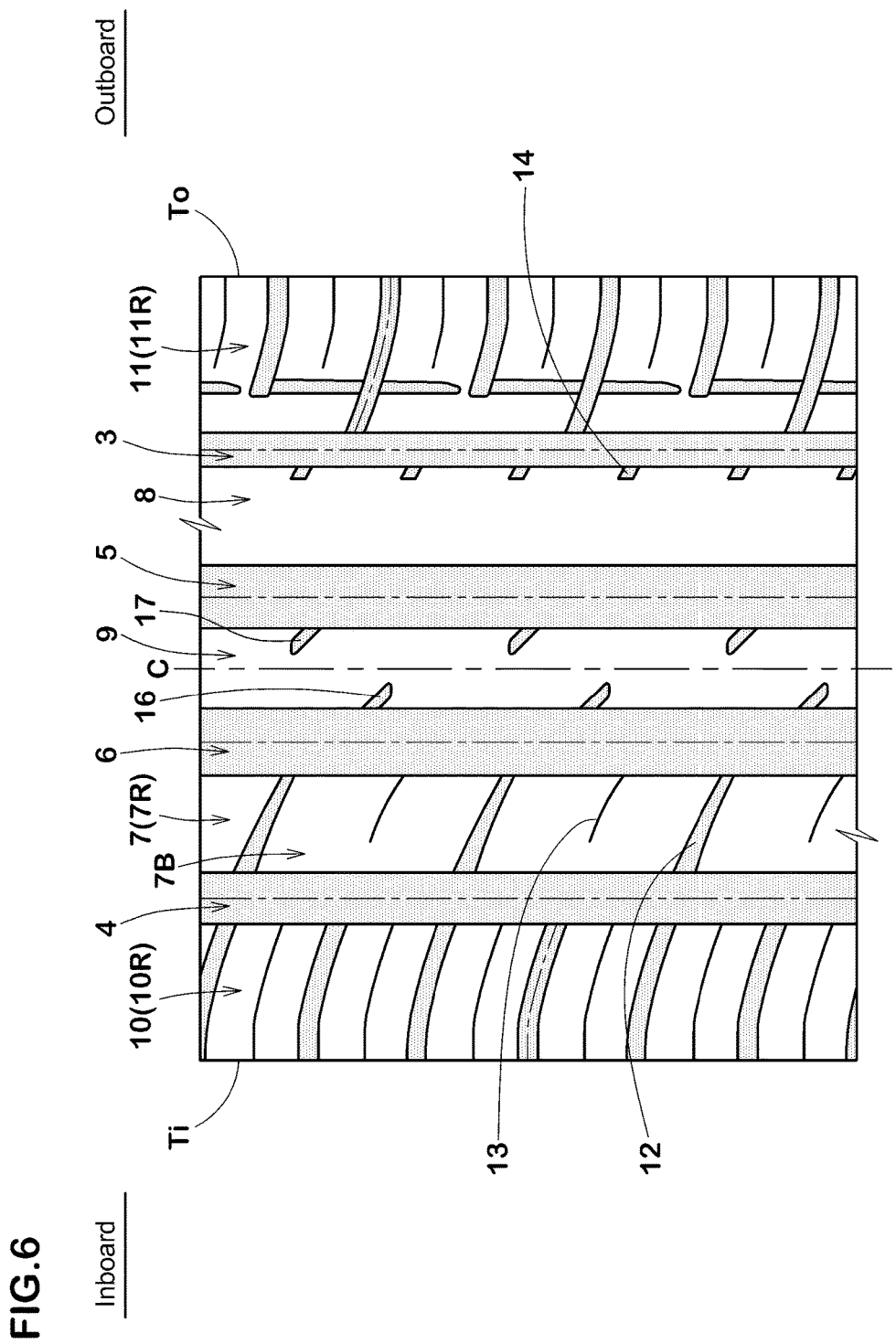

In the embodiments shown in FIG. 1, FIG. 3 and FIG. 4, each of the main grooves 3-6 is a straight groove whose edges are substantial parallel with the tire circumferential direction. Such main grooves 3-6 increase the rigidity of the land portions in the nearby part of each main groove 3-6, and prevent the occurrence of instability behavior of the car during braking such as wobbling, one-sided drifting and the like to improve the steering stability. Further, such main grooves 3-6 effectively discharge water existing therein to improve the wet performance.

It is preferable that the groove width W1 of the outboard shoulder main groove 3 and the groove width W2 of the inboard shoulder main groove 4 are less than the groove width W3 of the outboard crown main groove 5, and less than the groove width W4 of the inboard crown main groove 6.

In the tread crown portion where drainage toward the tread edges is difficult, the outboard crown main groove 5 and the inboard crown main groove 6 are made relatively wide to expedite the drainage and improve the wet performance.

In the tread shoulder portions which are subjected to a large lateral force, the outboard shoulder main groove 3 and the inboard shoulder main groove 4 are made relatively narrow to relatively increase the rigidity of the tread shoulder portion and improve the steering stability.

Preferably, the groove width W1 of the outboard shoulder main groove 3 is less than the groove width W2 of the inboard shoulder main groove 4.

Due to a negative camber angle of the wheel and crossfall or cross gradient of a road surface, the circumferential length of the ground contacting patch of the tire 1 becomes smaller on the outboard tread edge To side than the inboard tread edge Ti side. Accordingly, noise generated in the outboard shoulder main groove 3 is emitted easily in comparison with the inboard shoulder main groove 4. Therefore, it is preferable to ensure good noise performance by making the groove width W1 of the outboard shoulder main groove 3 smaller than the groove width W2 of the inboard shoulder main groove 4.

Preferably, the groove width W1 of the outboard shoulder main groove 3 is 2% to 6% of the tread width TW.

Preferably, the groove width W2 of the inboard shoulder main groove 4 is 4% to 8% of the tread width TW.

Preferably, the groove width W3 of the outboard crown main groove 5 and the groove width W4 of the inboard crown main groove 6 are 10% to 18% of the tread width TW.

In order to effectively derive the above-mentioned advantageous effects, the groove depths of the outboard shoulder main groove 3 and the inboard shoulder main groove 4 are preferably less than the groove depths of the outboard crown main groove 5 and the inboard crown main groove 6.

Preferably, the groove depths of the main grooves 3-6 are 7.0 to 9.5 mm.

The inboard middle land portion 7 is provided with inboard middle axial grooves 12 extending from the inboard shoulder main groove 4 to the inboard crown main groove 6, therefore, the inboard middle land portion 7 is divided into a row 7R of circumferentially arranged inboard middle blocks 7B.

The inboard middle axial grooves 12 are inclined at an angle θ1 of from 20 to 30 degrees with respect to the tire axial direction.
Such inboard middle axial grooves 12 ensure axial rigidity of the inboard middle land portion 7, and can lead the water therein toward the main grooves by utilizing tire rotations. Accordingly, the wet performance and the steering stability are improved in a well balanced manner.

The groove width W5 of the inboard middle axial groove 12 is gradually increased toward the inboard tread edge Ti. Such inboard middle axial grooves 12 expedite drainage from the inboard middle land portion 7 toward the axially outside and improve the wet performance.

In order to improve wet performance and steering stability in a well balanced manner, the maximum groove width W5a of the inboard middle axial groove 12 is preferably 1.5 to 2.5 times the minimum groove width W5b of the inboard middle axial groove 12.
The average of the groove width W5 of the inboard middle axial groove 12 is preferably 10% to 20% of the axial width Wa of the inboard middle land portion 7.
The groove depth of the inboard middle axial groove 12 is preferably 3.0 to 7.0 mm.

Each of the inboard middle blocks 7B is provided with a single inboard middle sipe 13.
The inboard middle sipes 13 improve the wet performance by their water-absorbing property and edge effect.

In each embodiment, the inboard middle sipes 13 extend axially inwardly from the inboard crown main groove 6 and terminate within the respective inboard middle blocks 7B so that there are no inboard middle sipes 13 in the axially outer part of the inboard middle land portion 7 where the inboard middle axial grooves 12 increase their widths. Thereby, the rigidity of the inboard middle land portion 7 is maintained to ensure the steering stability.

The axial length L1 of the inboard middle sipes 13 is preferably 60% to 75% of the axial width Wa of the inboard middle land portion 7.
If the axial length L1 is less than 60% of the axial width Wa, the water-absorbing effect is decreased, and there is a possibility that the wet performance is deteriorated. If the axial length L1 is more than 75% of the axial width Wa, the rigidity of the inboard middle land portion 7 becomes low, and there is a possibility that the steering stability is deteriorated.

The inboard middle sipes 13 are inclined in the same direction as the inboard middle axial grooves 12. Thereby, the rigidity of the inboard middle blocks 7B is maintained.
In order to effectively derive the above-mentioned advantageous effect, the angle θ2 of the inboard middle sipes 13 with respect to the tire axial direction is preferably 20 to 30 degrees.

The outboard middle land portion 8 is provided with outboard middle semi-blind grooves 14 and outboard middle sipes 15. The outboard middle semi-blind grooves 14 extend axially inwardly from the outboard shoulder main groove 3 and terminating within the outboard middle land portion 8. The outboard middle sipes 15 respectively extend from the axially inner ends 14i of the outboard middle semi-blind grooves 14 to the outboard crown main groove 5.

Such outboard middle semi-blind grooves 14 and outboard middle sipes 15 prevent the rigidity of the outboard middle land portion 8 from decreasing. Therefore, the difference in rigidity is decreased between the outboard middle land portion 8 subjected to a large lateral force during cornering and the inboard middle land portion 7 provided with the inboard middle axial grooves 12, and both clockwise vehicle turning and counter-clockwise vehicle turning can be made smoothly to further improve the steering stability.

The angle θ3 of the outboard middle semi-blind grooves 14 with respect to the tire axial direction and the angle θ4 of the outboard middle sipes 15 with respect to the tire axial direction are 20 to 30 degrees.
If the angle θ3 and the angle θ4 are less than 20 degrees, water beneath the outboard middle land portion 8 can not be smoothly drained toward the toe-side in the rotation direction by utilizing tire rotations. If the angle θ3 and the angle θ4 are more than 30 degrees, the axial rigidity of the outboard middle land portion 8 becomes low and the steering stability is deteriorated.

The outboard middle semi-blind grooves 14 and the outboard middle sipes 15 are inclined in the same direction. Therefore, the rigidity of the outboard middle land portion 8 is maintained, and good steering stability is ensured.

The width W6 of the outboard middle semi-blind grooves 14 is preferably 10% to 20% of the axial width Wb of the outboard middle land portion 8. The axial length L2 of the outboard middle semi-blind grooves 14 is preferably 5% to 18% of the axial width Wb of the outboard middle land portion 8. Such outboard middle semi-blind grooves 14 ensure rigidity of the outboard middle land portion 8.

The groove depth of the outboard middle semi-blind grooves 14 is not particularly limited, but preferably 5.5 to 7.0 mm.

The outboard middle sipes 15 and the inboard middle axial grooves 12 are inclined in the same direction.
Thereby, the water in the outboard middle sipes 15 and the water in the inboard middle axial grooves 12 are smoothly drained in the same direction by a lateral force during cornering, and the wet performance is improved.

Preferably, the number of the outboard middle sipes 15 is more than the number of the inboard middle axial grooves 12. Thereby, in the outboard middle land portion 8 subjected to a lateral force larger than the inboard middle land portion 7, great water-absorbing effect and edge effect can be exerted, and the wet performance is improved.
For example, the number of the outboard middle sipes 15 is 2 times the number of the inboard middle axial grooves 12.

The center land portion 9 is provided with inboard crown semi-blind grooves 16 and outboard crown semi-blind grooves 17. The inboard crown semi-blind grooves 16 extend from the inboard crown main groove 6 toward the outboard crown main groove 5 and terminating within the center land portion 9. The outboard crown semi-blind grooves 17 extend from the outboard crown main groove 5 toward the inboard crown main groove 6 and terminating within the center land portion 9.
Thereby, water existing between the center land portion 9 and the road surface can be effectively drained. Further, the inboard crown semi-blind grooves 16 and the outboard crown semi-blind grooves 17 make it possible to even the rigidity of the center land portion 9 between both side edge portions.

Therefore, the clockwise vehicle turning and counter-clockwise vehicle turning can be made more smoothly.

The inboard crown semi-blind grooves 16 and the outboard crown semi-blind grooves 17 are inclined in the same direction. Thereby, the axial rigidity of the center land portion 9 is maintained uniform along the tire circumferential direction, and the steering stability is improved.

Preferably, the angle θ5 of the inboard crown semi-blind grooves 16 with respect to the tire axial direction and the angle θ6 of the outboard crown semi-blind grooves 17 with respect to the tire axial direction are more than the angle θ1 of the inboard middle axial grooves 12 and more than the angle θ4 of the outboard middle sipes 15.

Such center semi-blind grooves 16, 17 smoothly drain the water in the grooves during straight running.

The angles θ5 and θ6 with respect to the tire axial direction are preferably 40 to 50 degrees.

If the angles θ5 and θ6 are less than 40 degrees, there is a possibility that the water in the semi-blind grooves 16 and 17 can not be smoothly discharge by utilizing tire rotations. If the angles θ5 and θ6 are more than 50 degrees, the rigidity of the center land portion 9 is decreased between the center semi-blind grooves (16 and 17) and the main grooves (5 and 6), and there is a possibility that the steering stability is deteriorated.

The inboard crown semi-blind grooves 16 are circumferentially shifted from the outboard crown semi-blind grooves 17. Thereby, a decrease in the axial rigidity of the center land portion 9 is prevented, and the steering stability can be maintained.

It is preferable that the maximum axial length L3 of the inboard crown semi-blind grooves 16 is the same as the maximum axial length L4 of the outboard crown semi-blind grooves 17. Thereby, the rigidity of the center land portion 9 becomes more even between both side edge portions.

The maximum axial length L3 of the inboard crown semi-blind grooves 16 is preferably 20% to 40% of the axial width wd of the center land portion 9.

If the maximum axial length L3 is less than 20% of the axial width Wd, there is a possibility that water existing between the center land portion 9 and the road surface can not be effectively discharged. If the maximum axial length L3 is more than 40% of the axial width Wd, the rigidity of the center land portion 9 is excessively decreased, and there is a possibility that the steering stability is deteriorated.

For the same reasons, the maximum axial length L4 of the outboard crown semi-blind grooves 17 is preferably 20% to 40% of the axial width Wd of the center land portion 9.

The groove depths of the inboard crown semi-blind grooves 16 and the outboard crown semi-blind grooves 17 are preferably not more than 5 mm.

Such center semi-blind grooves 16 and 17 maintain the rigidity of the center land portion 9 in both side edge portions, and ensure the steering stability.

For similar reasons, the groove width W7 of the inboard crown semi-blind grooves 16 and the groove width W8 of the outboard crown semi-blind grooves 17 are 10% to 20% of the axial width Wd of the center land portion 9.

The inboard shoulder land portion 10 is provided with inboard shoulder axial grooves 20 extending from the inboard shoulder main groove 4 to the inboard tread edge Ti. Thereby, the inboard shoulder land portion 10 is divided into a row 10R of circumferentially arranged inboard shoulder blocks 10B.

The inboard shoulder axial groove 20 comprises an oblique part 20A inclined with respect to the tire axial direction, and an axial part 20B disposed axially outside the oblique part 20A and extending parallel with the tire axial direction.

The oblique part 20A decreases the resistance to water flow in the groove during straight running, and secures high axial rigidity of the inboard shoulder land portion 10.

For this purpose, the angle θ7 of the oblique part 20A with respect to the tire axial direction is preferably not more than 25 degrees.

The axial part 20B secures high lateral stiffness in the vicinity of the inboard tread edge Ti of the inboard shoulder land portion 10 subjected to largest lateral force.

Each of the inboard shoulder blocks 10B is provided with a single inboard shoulder sipe 21 extending from the inboard shoulder main groove 4 to the inboard tread edge Ti.

In order to secure high rigidity of the inboard shoulder land portion 10, the inboard shoulder sipe 21 extends parallel with the inboard shoulder axial grooves 20.

In the embodiments, the inboard shoulder sipe 21 is equidistant from the adjacent inboard shoulder axial grooves 20.

The outboard shoulder land portion 11 is provided with outboard shoulder axial grooves 22 extending from the outboard shoulder main groove 3 to the outboard tread edge To.

Thereby, the outboard shoulder land portion 11 is divided into a row 11R of circumferentially arranged outboard shoulder blocks 11B.

The outboard shoulder axial groove 22 comprises an oblique part 22A inclined with respect to the tire axial direction, and an axial part 22B disposed axially outside the oblique part 22A and extending parallel with the tire axial direction.

Thereby, the wet performance and the steering stability are further improve in a well balanced manner.

The angle θ8 of the oblique part 22A with respect to the tire axial direction is preferably not more than 25 degrees.

Each of the outboard shoulder blocks 11B is provided with an outboard shoulder semi-blind groove 23, a first circumferential groove 24, a second circumferential semi-blind groove 25, a first outboard shoulder sipe 26, and a second outboard shoulder sipe 27.

The outboard shoulder semi-blind groove 23 extends axially inwardly from the outboard tread edge To and terminates within the outboard shoulder block 11B.

The first circumferential groove 24 extends from the axially inner end portion of the outboard shoulder semi-blind groove 23 to one of the adjacent outboard shoulder axial grooves 22, and the second circumferential semi-blind groove 25 extends from the other adjacent outboard shoulder axial groove 22 toward the above-mentioned one of the adjacent outboard shoulder axial grooves 22 and terminates within the outboard shoulder block 11B.

The first outboard shoulder sipe 26 extends axially inwardly from the outboard tread edge To toward the first circumferential groove 24, but terminates without reaching to the groove 24.

The second outboard shoulder sipe 27 extends axially inwardly from the outboard tread edge To toward the second circumferential semi-blind groove 25, but terminates without reaching to the groove 25.

The first outboard shoulder sipe 26 and the second outboard shoulder sipe 27 are respectively disposed on one side and the other side of the outboard shoulder semi-blind groove 23 in the tire circumferential direction.

The first outboard shoulder sipe 26 and the second outboard shoulder sipe 27 extend parallel with the outboard shoulder axial grooves 22.

It is preferable that the axial width Wa of the inboard middle land portion 7, the axial width Wb of the outboard middle land portion 8, the axial width Wd of the center land portion 9, the axial width Wf of the inboard shoulder land portion 10, the axial width Wg of the outboard shoulder land portion 11, and the tread width TW satisfy the following conditions:

$wd<wa,$ $wb<wf,$ $wb<wg,$ $wd/Tw=8\%$ to $14\%,$ $wa/Tw=12\%$ to $16\%,$ $wb/Tw=12\%$ to $16\%,$ $wf/Tw=15\%$ to $20\%,$ and $wg/Tw=15\%$ to $20\%.$ Thereby, the widths of the land portions 7-11 are optimized, and the steering stability is improved.

Since the inboard middle land portion 7 and the outboard middle land portion 8, which generate a lateral force largest in the tread when a steering angle is given to the tire, are provided with the widths wa and wb larger than conventional widths, the steering stability is effectively improved.

While detailed description has been made of specific embodiments of the present invention, the specific embodiments should not be construed as to limit the scope of the present invention; the present invention may be embodied in various forms.

Comparison Tests

Pneumatic tires for passenger cars were manufactured and tested for the steering stability and wet performance. Specifications are shown in Table 1.

Common specifications are as follows.
    tire size: 205/55R16 (rim size: 15×6JJ)
    tread width Tw: 158 mm
    outboard shoulder main groove depth: 7.8 mm
    inboard shoulder main groove depth: 7.8 mm
    outboard crown main groove depth: 8.0 mm
    inboard crown main groove depth: 8.0 mm
    inboard middle axial groove depth: 3.4 to 6.3 mm
    outboard middle semi-blind groove depth: 6.3 mm <Steering Stability (Cornering Force)>

Using an indoor tire tester, each test tire (tire pressure: 200 kPa, tire load: 4.83 kN) was measured for a cornering force CF[+1 deg.] at the slip angle of +1 degrees, and a cornering force CF[−1 deg.] at the slip angle of −1 degrees, and the cornering power CP was obtained by the following equation: $CP=(CF[+1\ deg.]-CF[-1\ deg.])/2.$ The results are indicated in Table 1 by an index based on Embodiment tire Ex. 1 being 100, wherein the larger the value, the higher the cornering power.

<Wet Performance>

A 2000 cc front-wheel-drive car provided on all wheels with test tires was run along a 100 meter radius circle on an asphalt road partially provided with a 5 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in table 1 by an index based on Embodiment tire Ex. 1 being 100, wherein the larger is better.

TABLE 1

| Tire | Ref. 1 | Ref. 2 | Ref. 3 | Ex. 1 | Ex. 2 | Ex. 3 | Ref. 4 |
|---|---|---|---|---|---|---|---|
| tread pattern (FIG. No.) | 5 | 6 | 1 | 1 | 1 | 1 | 1 |
| inboard middle axial groove angle θ1 (deg.) | 25 | 25 | 15 | 25 | 20 | 30 | 35 |
| outboard middle sipe angle θ4 (deg.) | 25 | 25 | 25 | 25 | 25 | 25 | 25 |
| inboard crown semi-blind groove depth (mm) | 5 | 5 | 5 | 5 | 5 | 5 | 5 |
| wet performance | 90 | 90 | 95 | 100 | 98 | 98 | 95 |
| steering stability | 90 | 92 | 95 | 100 | 98 | 98 | 95 |

| Tire | Ref. 5 | Ex. 4 | Ex. 5 | Ref. 6 | Ex. 6 | Ex. 7 | Ex. 8 |
|---|---|---|---|---|---|---|---|
| tread pattern (FIG. No.) | 1 | 1 | 1 | 1 | 1 | 3 | 4 |
| inboard middle axial groove angle θ1 (deg.) | 25 | 25 | 25 | 25 | 25 | 25 | 25 |
| outboard middle sipe angle θ4 (deg.) | 15 | 20 | 30 | 35 | 25 | 25 | 25 |
| inboard crown semi-blind groove depth (mm) | 5 | 5 | 5 | 5 | 7 | 5 | 5 |
| wet performance | 95 | 98 | 98 | 95 | 101 | 98 | 100 |
| steering stability | 95 | 98 | 98 | 95 | 96 | 99 | 97 |

From the test results, it was confirmed that, in comparison with comparative example tires, Embodiment tires were improved in the wet performance and steering stability in a well balanced manner.

The invention claimed is:

1. A pneumatic tire comprising:
    a tread portion provided with a tread pattern asymmetric about the tire equator, and having an outboard tread edge and inboard tread edge to be positioned toward the outside and inside of a vehicle, respectively, wherein
    the tread portion from the outboard tread edge to the inboard tread edge is divided into five land portions, which are an outboard shoulder land portion, an outboard middle land portion, a center land portion, an inboard middle land portion, and an inboard shoulder land portion, by four circumferentially continuously extending main grooves, which are an outboard shoulder main groove, an outboard crown main groove, an inboard crown main groove, and an inboard shoulder main groove,
    the inboard middle land portion is provided with open axial grooves each extending across the entire width of the land portion to have both ends opened to the main grooves on both sides of the land portion, and not provided with semi-blind axial grooves each having one end opened to one of the adjacent main grooves and the other end closed in the land portion, wherein said open axial grooves are inboard middle axial grooves extending from the inboard shoulder main groove to the inboard crown main groove and inclined at an angle of from 20 to 30 degrees with respect to the tire axial direction, the outboard middle land portion is provided with semi-blind axial grooves each having one end opened to one of the adjacent main grooves and the other end closed in the land portion, and not provided with open axial grooves each extending across the entire width of the land portion to have both ends opened to the main grooves on both sides of the land portion, wherein said semi-blind axial grooves are outboard middle semi-blind grooves extending axially inwardly from the outboard shoulder main groove and terminating within the outboard middle land portion, and further the outboard middle land portion is provided with outboard middle sipes respectively extending from the axially inner ends of the outboard middle semi-blind grooves to the outboard crown main groove, the outboard middle semi-blind grooves and the outboard middle sipes are inclined at an angle of 20 to 30 degrees with respect to the tire axial direction, and the center land portion is provided with inboard crown semi-blind grooves extending from the inboard crown main groove toward the outboard crown main groove and terminating within the center land portion, and outboard crown semi-blind grooves extending from the outboard crown main groove toward the inboard crown main groove and terminating within the center land portion.

2. The pneumatic tire according to claim 1, wherein the inboard middle axial grooves and the outboard middle sipes are inclined in the same direction.

3. The pneumatic tire according to claim 1, wherein the number of the inboard middle axial grooves is less than the number of the outboard middle sipes.

4. The pneumatic tire according to claim 1, wherein depths of the inboard crown semi-blind grooves and the outboard crown semi-blind grooves are not more than 5 mm.

5. The pneumatic tire according to claim 1, wherein the inboard crown semi-blind grooves and the outboard crown semi-blind grooves are inclined in the same direction.

6. The pneumatic tire according to claim 1, wherein
the inboard middle land portion is circumferentially divided by the inboard middle axial grooves into a row of inboard middle blocks, and
each of the inboard middle blocks is provided with an inboard middle sipe extending from the inboard crown main groove toward the inboard shoulder main groove and terminating within the inboard middle block.

7. The pneumatic tire according to claim 1, wherein
the inboard middle land portion is provided with sipes, wherein the sipes are inboard middle sipes each extending axially outwardly from the inboard crown main groove to have an open end and terminating within the inboard middle land portion to have a closed end, and the inboard middle sipes are arranged alternately with the inboard middle axial grooves, and
the outboard middle land portion is provided with sipes, wherein the sipes are said outboard middle sipes respectively extending from the axially inner ends of the outboard middle semi-blind grooves to the outboard crown main groove.

8. The pneumatic tire according to claim 7, wherein the axial length of the outboard middle semi-blind grooves is 5% to 18% of the axial width of the outboard middle land portion.

9. The pneumatic tire according to claim 8, wherein the inboard middle axial grooves and the outboard middle sipes are inclined in the same direction.

10. The pneumatic tire according to claim 9, wherein
the inboard crown semi-blind grooves and the outboard crown semi-blind grooves are arranged alternately in the tire circumferential direction, and inclined in the same direction, and
depths of the inboard crown semi-blind grooves and the outboard crown semi-blind grooves are not more than 5 mm.

* * * * *